(12) United States Patent
Tosa

(10) Patent No.: US 7,509,044 B2
(45) Date of Patent: Mar. 24, 2009

(54) ELECTRONIC DEVICE, PHOTOGRAPHING CONTROL METHOD, AND PHOTOGRAPHING CONTROL PROGRAM

(75) Inventor: Masaharu Tosa, Kato-gun (JP)

(73) Assignee: Fujitsu Limited, Kawasaki (JP)

( * ) Notice: Subject to any disclaimer, the term of this patent is extended or adjusted under 35 U.S.C. 154(b) by 552 days.

(21) Appl. No.: 11/239,400

(22) Filed: Sep. 30, 2005

(65) Prior Publication Data

US 2006/0280494 A1 Dec. 14, 2006

(30) Foreign Application Priority Data

Jun. 13, 2005 (JP) ............................. 2005-172607

(51) Int. Cl.
*G03B 17/18* (2006.01)
*H04N 5/232* (2006.01)
(52) U.S. Cl. ..................... 396/281; 396/67; 396/283; 348/333.04
(58) Field of Classification Search .................. 396/65, 396/67, 70, 88, 147, 281, 283, 287, 296; 702/158–159; 356/3, 4.01; 348/333.01, 348/333.02, 333.04
See application file for complete search history.

(56) References Cited

FOREIGN PATENT DOCUMENTS

| JP | 06303491 A | * | 10/1994 |
|---|---|---|---|
| JP | 11339048 A | * | 12/1999 |
| JP | 2000-004435 | | 1/2000 |
| JP | 2001-231030 | | 8/2001 |

* cited by examiner

*Primary Examiner*—Bot LeDynh
(74) *Attorney, Agent, or Firm*—Hanify & King, P.C.

(57) ABSTRACT

The present invention relates to an electronic device such as mobile terminal devices with a photographing function, and in the case where a photographing target is a person, enhances its function for protecting the photographing target from being photographed without consent by such as spy shots. This can be realized by an electronic device with a photographing function (mobile terminal device 2, PDA 108, digital camera 110) comprising a target judging part (photographing control part 6) for judging whether the photographing target is a person or not; a photographing inquiry part (photographing approval/disapproval inquiry part 12) for issuing an inquiry information for approval/disapproval of the photographing based on the judgment result of the target judging part if the target is a person and making an inquiry for the target about whether the photographing is approved or not with the inquiry information; a response information acquisition part (14) for acquiring a response information issued from the target; and a photographing control part (6) for outputting in response to the inquiry information either a photographing approval information representing an approval of photographing the target or a photographing prohibition information representing a ban of photographing the target, based on the response information the response information acquisition part has acquired.

6 Claims, 16 Drawing Sheets

ELECTRONIC DEVICE, PHOTOGRAPHING CONTROL METHOD, AND PHOTOGRAPHING CONTROL PROGRAM

CROSS-REFERENCE TO RELATED APPLICATIONS

This application is based upon and claims the benefit of priority from the prior Japanese Patent Application No. 2005-172607, filed on Jun. 13, 2005, the entire contents of which are incorporated herein by reference.

BACKGROUND OF THE INVENTION

1. Field of the Invention

The present invention relates to an electronic device such as mobile terminal devices with a photographing function, and more specifically relates to an electronic device with a function for preventing spy shots of a person or photographing without consent of a subject, a photographing control method, and a photographing control program.

2. Description of the Related Art

In an electronic device such as mobile terminal devices with a camera function, a shutter sound or the like is emitted as a sound of photographing confirmation on photographing in order to inform the people around of the photographing action. The sound of photographing confirmation merely indicates that a photographing action was performed. Therefore, suggestions have been made about technologies for providing a chance for the photographing subject to express refusal of the photographing, for blocking spy shots, and for serving as an impetus to refrain from taking stealthy photos.

Among conventional technologies related to such photographing, there is one that enables a start of photographing after a lapse of a prescribed time from the moment when an advance notice of photographing signal is outputted (e.g., Japanese Patent Application Laid-Open Publication No. 2001-231030 (Abstract, Paragraph No. 0021, FIG. 1, etc.)); one that recognizes a voice of a photographing subject and by identifying the voice rejecting the photographing, changes the photographing direction and the angle of view so that the subject does not enter into the photographing area (e.g., Japanese Patent Application Laid-Open Publication No. 2000-4435 (Paragraph No. 0021, FIGS. 1 and 2, etc.)).

By the way, there are problems that when a notification is made after a photo was taken, the target that was photographed is hard to be identified as a person or scenery or the like; and that in many cases wish of the photographed subject to delete the shot data is difficult to be satisfied. In addition, there is a problem that photographing still continues regardless of the intention of the photographing target even though the photographing sound is emitted.

In the technology disclosed in the Japanese Patent Application Laid-Open Publication No. 2001-231030, photographing starts after a lapse of a prescribed time from the moment when an advance notice of photographing signal is outputted, which is not intended for a refusal or a ban of photographing. Further, in the technology disclosed in the Japanese Patent Application Laid-Open Publication No. 2000-4435, only the photographing direction and the angle of view is changed such that the person who has vocalized does not enter into the photographing area, by recognizing the voice of the photographing subject denying the photographing. In both technologies, there is a risk that the person who refuses to be photographed may be photographed.

SUMMARY OF THE INVENTION

The issue of the present invention is, in regard to an electronic device such as mobile terminal devices with a photographing function, to enhance a function for preventing a photographing target from being photographed without consent by such as spy shots in the case where the photographing target is a person.

Each aspect of the present invention in order to solve the above-described issues will be listed and explained hereinafter.

According to a first aspect of the present invention there is provided an electronic device with a photographing function, comprising a target judging part for judging whether a photographing target is a person or not; and a photographing inquiry part for issuing an inquiry information for approval/disapproval of photographing based on the judgment result of the target judging part if the photographing target is a person, and for making an inquiry for the photographing target about whether the photographing is approved or not with the inquiry information.

The electronic devices include such as mobile terminal devices and digital cameras that are equipped with a photographing function. At the target judging part, a judgment is made about whether a photographing target is a person or not. Based on this judgment, if it is a person, then an inquiry information for approval/disapproval of photographing is issued to the photographing target from the photographing inquiry part. Issuing this inquiry information can draw attention of the photographing target to the photographing, and can serve as an impetus for the photographer to refrain from taking stealthy photos. That is, photographing without consent such as spy shots can be prevented and photographs will be taken with the consent of the photographing target.

It is preferable for this electronic device to include a living body information acquisition part for acquiring a living body information from the photographing target, and to configure the target judging part to judge whether the photographing target is a person or not from the living body information acquired at the living body information acquisition part. Although there exists various types of information among the information to judge whether the photographing target is a person or not, in the present invention, as one example, a living body information is acquired from the photographing target and from the fact that the living body information is acquired, the photographing target is judged as a person.

According to a second aspect of the present invention there is provided an electronic device with a photographing function, comprising a photographing inquiry part for issuing an inquiry information for approval/disapproval of photographing and for making an inquiry for a photographing target about whether the photographing is approved or not with the inquiry information; a response information acquisition part for acquiring a response information issued from the photographing target; and a photographing control part for outputting either a photographing approval information representing an approval of photographing the target or a photographing prohibition information representing a ban of photographing the target, based on the response information corresponding to the inquiry information the response information acquisition part has acquired.

According to this configuration, an inquiry information for approval/disapproval of photographing is issued from the photographing inquiry part, regardless of whether the photographing target is a person or not, and with this inquiry information, an inquiry for approval/disapproval of photographing is made to the photographing target. If a response information is issued from the photographing target having received the inquiry information, the response information is acquired at the response information acquisition part. Thereafter, the photographing control part outputs, in response to the inquiry information issued from the photographing inquiry part, either a photographing approval information representing an approval of photographing the target or a photographing prohibition information representing a ban of photographing the target, based on the response information the response information acquisition part has acquired. Electronic devices include such as mobile terminal devices and digital cameras, which have a photographing function. As a result, if the photographing approval information is outputted, then photographing action is activated and shot images are captured; or if the photographing prohibition information is outputted, then photographing action is suppressed and capturing of shot images are either blocked or discarded.

According to a third aspect of the present invention there is provided a photographing control method of an electronic device with a photographing function, comprising the processing of judging whether a photographing target is a person or not; and issuing an inquiry information for approval/disapproval of photographing based on the result of judgment if the target of photographing is a person and making an inquiry for the photographing target about whether the photographing is approved or not with the inquiry information.

According to this configuration, a judgment is made about whether the photographing target is a person or not, and if it is a person, then an inquiry information for approval/disapproval of photographing is issued, and this inquiry information triggers the approval/disapproval of photographing. That is, combining the processing of judging a person with the processing of issuing the inquiry information for photographing can draw attention of the photographing target to the photographing and serve as an impetus for the photographer to refrain from taking stealthy photos.

According to a fourth aspect of the present invention there is provided a photographing control program of an electronic device with a photographing function, the program to be executed by a computer, comprising the steps of judging whether a photographing target is a person or not; and issuing an inquiry information for approval/disapproval of photographing based on the result of judgment if the photographing target is a person and making an inquiry for the photographing target about whether the photographing is approved or no with the inquiry information.

According to this configuration, an electronic device in which a computer is mounted can execute the processing of judging whether a photographing target is a person and issuing the inquiry information for photographing through its program. Execution of such a program can draw the attention of the photographing target to the photographing and serve as an impetus for the photographer to refrain from taking stealthy photos.

To solve the above-described issue, the previously described electronic device may further comprise an image acquisition part for acquiring a shot image from the photographing target, wherein the target judging part may judge whether the target is a person or not from the shot image acquired at the image acquisition part.

To solve the above-described issue, the previously described electronic device may further comprise an infrared radiation sensor for applying infrared radiation to the photographing target and receiving the infrared radiation back from the target, wherein the target judging part may judge whether the target is a person or not from the received infrared radiation at the infrared radiation sensor.

According to this configuration, a judgment can be made whether the target is a person or not from the infrared radiation emitted from the living body or a face pattern of the living body. The infrared radiation sensor 34 can be used for detecting the infrared radiation and the shot image acquisition part 4 can be used for the living body information acquisition detecting a face pattern of the living body. In that case, a judgment whether the target is a person or not is made at the photographing control part 6.

To solve the above-described issue, the previously described electronic device may further comprise record medium for recording a shot image of the photographing target, wherein the shot image may be recorded into the record medium if the photographing approval information is acquired; or wherein the photographing inquiry part may further comprise a speaker and output a voice representing an inquiry message as the inquiry information.

To solve the above-described issue, in the previously described electronic device, the response information acquisition part may further comprise a microphone and acquire a voice issued from the photographing target as the response information.

In this configuration, if a microphone with directivity is used for the microphone, a voice issued from the target can be selectively acquired.

To solve the above-described issue, the previously described electronic device may further comprise an image acquisition part for acquiring a shot image from the photographing target, wherein the response information acquisition part acquires change in the shot image corresponding to the inquiry information issued from the photographing inquiry part as the response information.

To solve the above-described issue, a photographing control method of an electronic device with a photographing function may comprise the processing of: issuing an inquiry information for approval/disapproval of photographing and making an inquiry for a photographing target about whether the photographing is approved or not with the inquiry information; acquiring a response information issued from the photographing target; and outputting in response to the inquiry information either a photographing approval information representing an approval of photographing the target or a photographing prohibition information representing a ban of photographing the target, based on the response information.

To solve the above-described issue, the photographing control method of the previously described electronic device may further comprise the processing of: acquiring a shot image from a photographing target; and judging whether the photographing target is a person or not from the acquired shot image; or may further comprise the processing of recording the shot image into record medium in the case where the photographing approval information is acquired.

To solve the above-described issue, a photographing control program of an electronic device with a photographing function, the program to be executed by a computer may comprise the steps of: issuing an inquiry information for approval/disapproval of photographing and making an inquiry for a photographing target about whether the photographing is approved or not with the inquiry information; acquiring a response information issued from the photographing target; and outputting in response to the inquiry information either a photographing approval information representing an approval of photographing the target or a photographing prohibition information representing a ban of photographing the target, based on the response information.

To solve the above-described issue, the photographing control program of the previously described electronic device may further comprise the steps of: acquiring a shot image from the photographing target; judging whether the photographing target is a person or not from the acquired shot image; and recording the shot image into record medium if the photographing approval information is acquired.

According to the present invention, regarding an electronic device such as mobile terminal devices with a photographing function, a function for protecting a photographing target from being photographed without consent by such as stealthy photographing can be enhanced if a photographing target is a person, so that it can contribute to prevent photographing without consent.

The above and other objects, features and advantages of the present invention will become more apparent from the following detailed description when taken in conjunction with the accompanying drawings.

DETAILED DESCRIPTION OF THE PREFERRED EMBODIMENTS

First Embodiment

Figure 1:
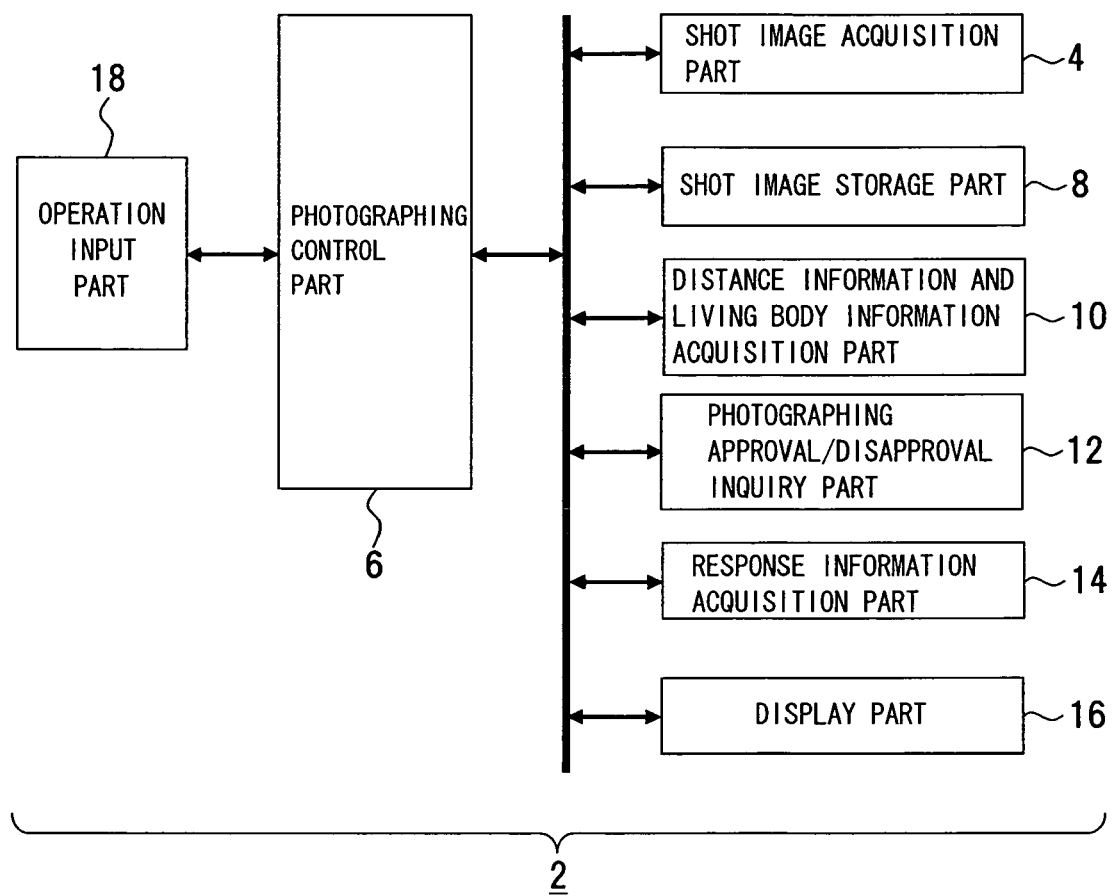
FIG. 1 is a block diagram showing a mobile terminal device according to a first embodiment.

A first embodiment of the present invention will be described with reference to FIG. 1. FIG. 1 is a block diagram showing a mobile terminal device according to a first embodiment.

This mobile terminal device 2 is one example of electronic devices providing a photographing function by mounting a camera or the like. This mobile terminal device 2 has a photographing function and enhances its function for preventing spy shots or photographing without consent by issuing an inquiry information for approval/disapproval of photographing; and by approving or disapproving photographing the target, and by capturing or blocking a shot image of the target, based on a response information from the target.

The mobile terminal device 2 having such functions includes a shot image acquisition part 4, a photographing control part 6, a shot image storage part 8, a distance information and living body information acquisition part 10, a photographing approval/disapproval inquiry part 12, a response information acquisition part 14, a display part 16, an operation input part 18 and others.

The shot image acquisition part 4 constitutes a camera part and acquires a shot image from a photographing target. The acquired shot image is displayed on the display part 16. The display part 16 also serves as a finder, and users specify the target, change the angle of view, and decide the photographing conditions such as the photographing area by looking at the displayed images. The shot image acquired at this shot image acquisition part 4 is used for judging whether the photographing target is a person or not.

The photographing control part 6 is comprised of a computer, for example, and accepts operation input such as photographing starting input added from the operation input part 18, and performs image acquisition by the shot image acquisition part 4; storage of the shot image into the shot image storage part 8; its readout or deletion, and also controls the photographing approval/disapproval inquiry part 12, the response information acquisition part 14, and the display part 16. This photographing control part 6 includes a CPU (Central Processing Unit), a ROM (Read-Only Memory) as record medium, a RAM (Random-Access Memory), or the like. The CPU controls computation, and the ROM stores such as a photographing control program including a spy shots preventive function, and the RAM temporary stores data in the middle of processing. In this case, the photographing control part 6 provides a function as a target judging part for judging whether a photographing target is a person or not from the shot image acquired at the shot image acquisition part 4 and a living body information acquired at the distance information and living body information acquisition part 10. The judgment result of this target judging part is used for a control information for approval/disapproval of photographing. Another medium other than the described above may be used for the record medium storing the photographing control program.

The shot image storage part 8 is comprised of such as record medium for storing shot images and stores the shot images acquired at the shot image acquisition part 4. If the target is a person, and if approval of photographing is acquired, then photographing operation is performed and its shot image is stored into this shot image storage part 8.

The distance information and living body information acquisition part 10 acquires a living body information from the target independently of the shot image and a distance information representing the distance between the mobile terminal device 2 and the target. The living body information is, for example, infrared radiation emitted from the target or other information. The distance information represents the distance between the photographing target emitting the living body information and the mobile terminal device 2, and is used for specifying the location where the living body information is emitted.

The photographing approval/disapproval inquiry part 12 issues an inquiry information for approval/disapproval of photographing to the target and makes an inquiry for the target about whether the photographing is approved or not with the inquiry information. The inquiry information is, for example, a voice representing an inquiry message. This photographing approval/disapproval inquiry part 12 may be configured to issue an inquiry information in the case where the target is a person, or configured to issue an inquiry information regardless of whether the target is a person or not.

The response information acquisition part 14 acquires a response information issued from the target in response to the inquiry information issued from the photographing approval/disapproval inquiry part 12. This response information is, for example, a voice acquired from the target. In this case, change of image that appears in the shot image brought by the target reacting to the inquiry information can be recognized also as a response information, which can be acquired at the shot image acquisition part 4. Therefore, the response information acquisition part 14 may be configured to process change in the shot image acquired at the shot image acquisition part 4.

The display part 16 displays shot images, control information, icons, and the like. This display part 16 is comprised of an LCD (Liquid Crystal Display), for example.

The operation input part 18 is comprised of, for example, a keyboard or the like, and includes a photographing start key and a shutter key and so on.

According to this configuration, the distance information and living body information acquisition part 10 is operated based on the operation of the operation input part 18, and thereby a living body information and a distance information are acquired from the target. The photographing control part 6 as the target judging part judges from the living body information whether the target is a person or not, and based on this judgment result, if it is a person, then issues an inquiry information for approval/disapproval of photographing and makes an inquiry for the target about whether the photographing is approved or not with the inquiry information. The distance information is referenced for specifying the location where the living body information is acquired, and with this specification of the location, reliability of the living body information is enhanced. Configuring in such a way that the inquiry information is issued to the target can draw the attention of the target to the photographing, and can serve as an impetus for the photographer to refrain from taking photos without consent such as spy shots.

Further, the photographing approval/disapproval inquiry part 12 issues the inquiry information for approval/disapproval of photographing and the target is inquired about the photographing. At that time, the response information issued from the target is acquired at the response information acquisition part 14. Thereafter, the photographing control part 6 outputs in response to the inquiry information either a photographing approval information for representing an approval of photographing the target or a photographing prohibition information for representing a ban of photographing the target, after judging the response information acquired at the response information acquisition part 14.

If the photographing approval information is outputted, then the shot image in the middle of acquisition is stored into the shot image storage part 8, whereas if the photographing prohibition information is outputted, then the photographing operation is stopped; the shot image in the middle of acquisition is discarded; and the processing of storing into the shot image storage part 8 is stopped or banned. According to this configuration, if the target, i.e., the subject of photograph is a person, photographing without consent is prevented; the shot image in the middle of acquisition is discarded; recording of the shot images becomes only available when the photographing is permitted, so that a person's right of publicity can be protected.

Figure 2:
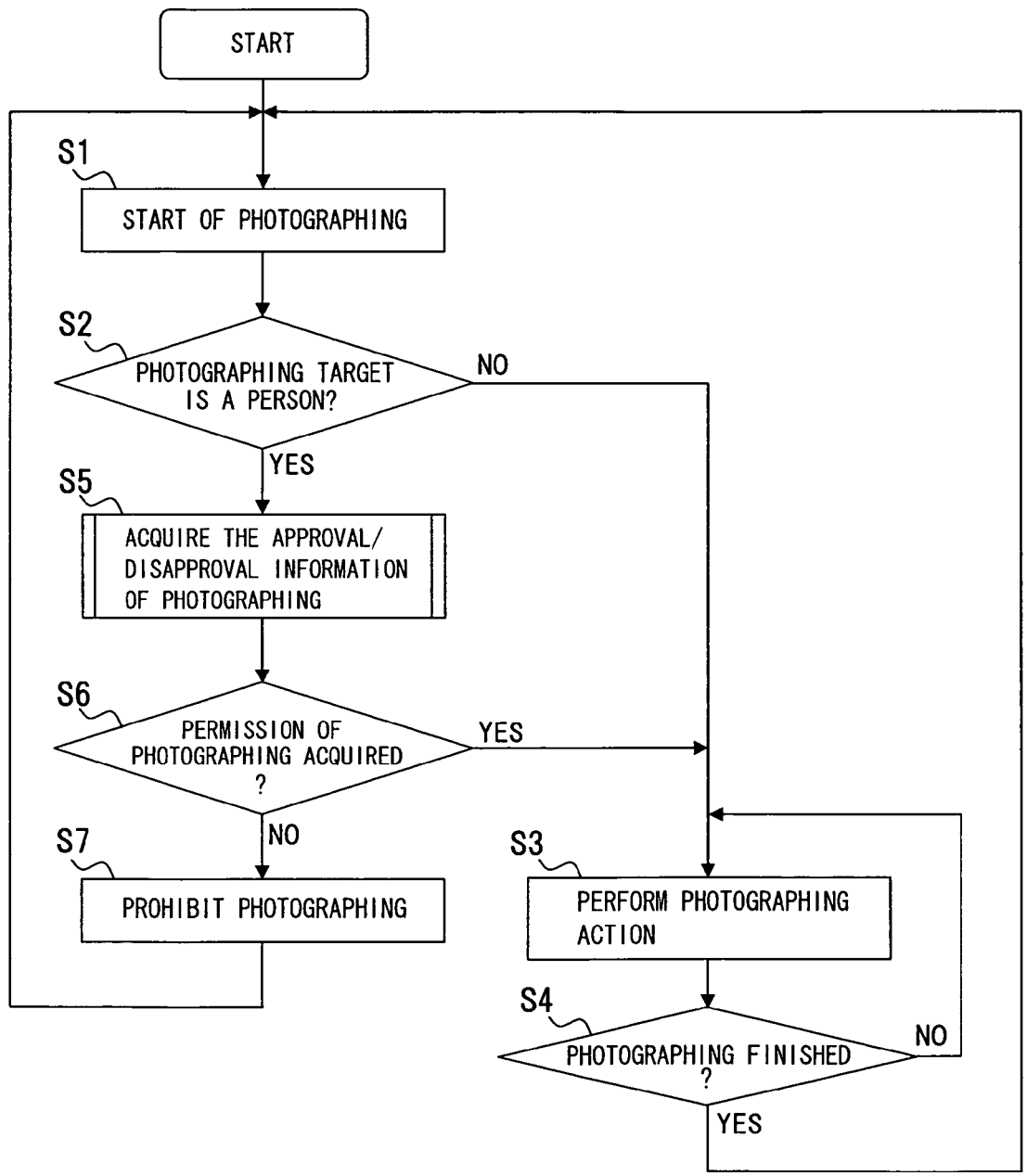
FIG. 2 is a flowchart showing photographing control operation of the mobile terminal device.
Figure 3:
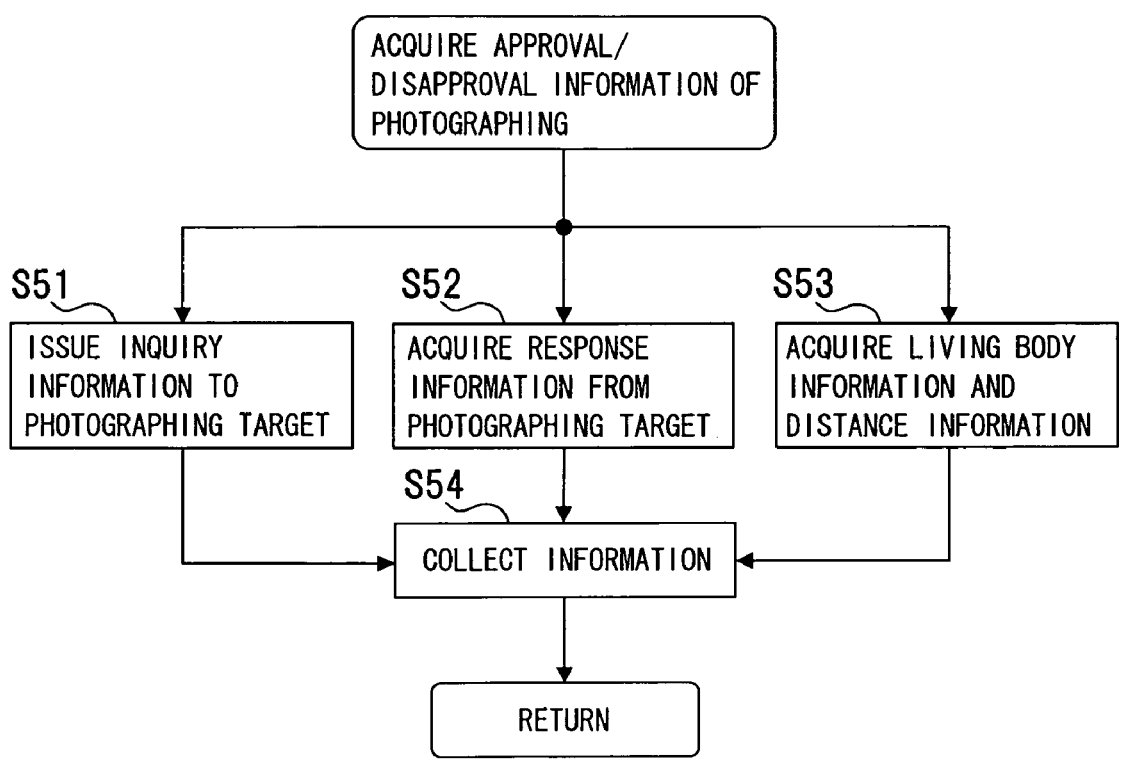
FIG. 3 is a flowchart showing acquisition operation of an approval/disapproval information for photographing.

Next, photographing control processing including spy shots prevention operation will be described with reference to FIGS. 2 and 3. FIG. 2 is a flowchart showing photographing control operation as one example of photographing control method and photographing control program; and FIG. 3 is a flowchart showing acquisition operation of a photographing approval/disapproval information as one example of photographing control method and photographing control program.

Photographing is started by operation input of the operation input part 18 (step S1); then a judgment is made about whether a photographing target is a person or not (step S2); if it is not a person, then photographing operation is performed immediately without the processing of acquiring the approval/disapproval information of photographing (step S3). In this photographing operation, the shot image in the middle of acquisition is stored into the shot image storage part 8. The procedure monitors whether the photographing is finished or not (step S4), and continues the photographing operation until it finishes, then returns to step S1 when it is finished.

If the target is a person, then after the processing of acquiring the approval/disapproval information of photographing (step S5); a judgment is made on whether there is a photographing approval or not (step S6); if there is, then the procedure moves to step S3 to perform photographing operation. If the photographing is not approved, then the procedure performs the processing of prohibiting the photographing (step S7), then returns to step S1. If the photographing is not approved, storage of the shot image is banned and the shot image in the middle of acquisition is discarded or the like.

In this way, in contrast to immediate shift to the photographing operation in the case where the target is not a person; if the target is a person, the photographing operation takes place after acquiring the approval/disapproval information of photographing, followed by acquisition of photographing approval.

In the processing of acquiring the approval/disapproval information of photographing at step S5 (subroutine), as shown in FIG. 3, an inquiry information is issued to the target (step S51). This inquiry information is issued from the photographing approval/disapproval inquiry part 12, which is, for example, a voice message for inquiring approval/disapproval of photographing. A response information from target, which corresponds to the inquiry information is acquired (step S52). This response information is acquired at the response information acquisition part 14. Further, a living body information and a distance information are acquired as a confirmation information of the target (step S53). This living body information and distance information is acquired at the distance information and living body information acquisition part 10. Acquisition of these information is controlled by the photographing control part 6, and after collecting these information (step S54), a decision is made for approval/disapproval of photographing.

By such processing, if the target is a person, then the response information from a person, i.e., the subject, the living body information and the distance information are referenced; and the procedure shifts to the photographing operation if there is a photographing approval, followed by the shot image capturing and its storage; or stops the photographing operation if there is not a photographing approval.

Second Embodiment

Figure 4:
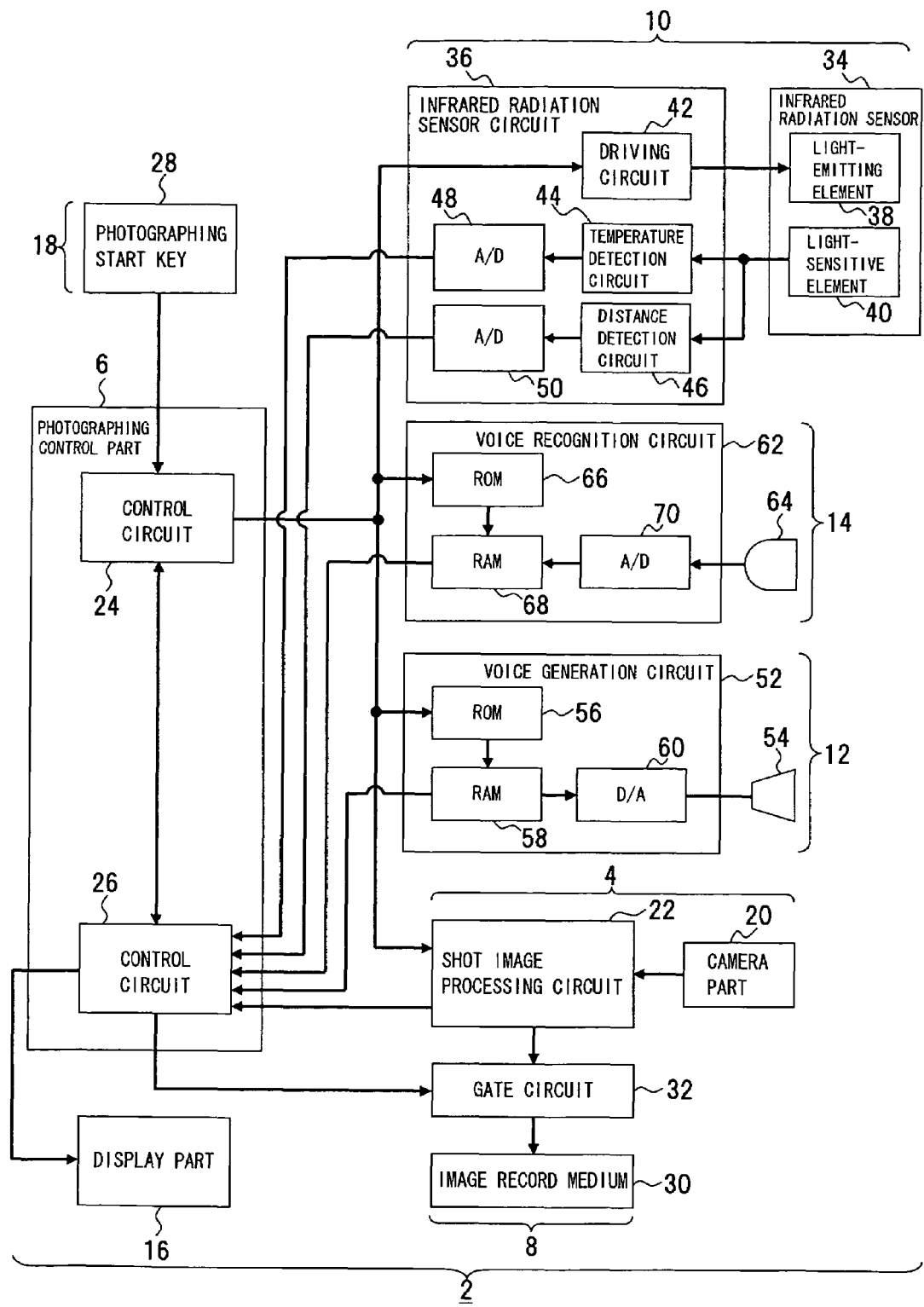
FIG. 4 is a block diagram showing a mobile terminal device according to a second embodiment.
Figure 5:
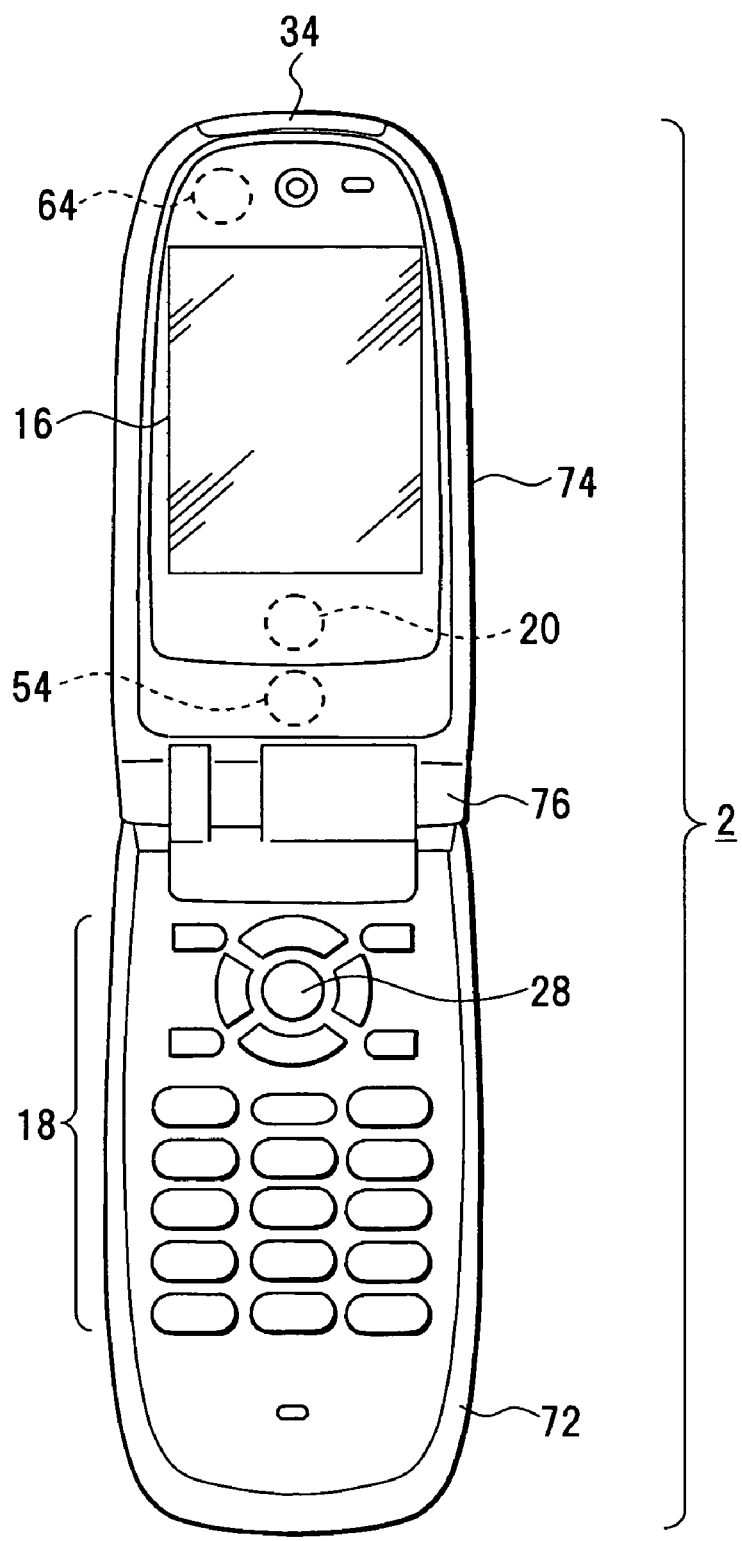
FIG. 5 is a diagram showing appearance of a mobile terminal device.

A second embodiment of the present invention will be described with reference to FIGS. 4 and 5. FIG. 4 is a block diagram of a mobile terminal device according to a second embodiment. FIG. 5 is a diagram showing a configuration example of a mobile terminal device. In FIGS. 4 and 5, the same symbols are assigned to parts identical to those of the mobile terminal device 2 in FIG. 1.

In this mobile terminal device 2, the shot image acquisition part 4 includes a camera part 20 and a shot image processing circuit 22 and others, wherein the camera part 20 is a camera function part and comprised of a CCD (Charge Coupled Device), for example. The shot image acquired at the camera part 20 is added to the photographing control part 6 via digital processing in the shot image processing circuit 22. In this case, the shot image processing circuit 22 includes a RAM for holding the shot image in the middle of photographing. This shot image is displayed on the display part 16 to be used for processing of autofocus and the like.

The photographing control part 6 includes a first control circuit 24 and a second control circuit 26. At the control circuit 24 side, based on the operation of the photographing start key 28 in the operation input part 18, operations of the shot image acquisition part 4, the distance information and living body information acquisition part 10, the photographing approval/disapproval inquiry part 12, the response information acquisition part 14, and the like are started. While at the control circuit 26 side, the acquired information from these circuits are captured and used for a judgment about whether a target is a person or not. Whether a target is a person or not can be judged through recognition processing of face images of a human body from the shot image by using existing face detection software and the like, or through the absence of face images.

In the shot image storage part 8, an image record medium 30 is disposed, and this image record medium 30 is connected to the shot image processing circuit 22 via a gate circuit 32. The gate circuit 32 is controlled to either a conducting state or a breaking state by the photographing control part 6. When this gate circuit 32 is under a conducting state, the shot image at the shot image processing circuit 22 is stored into the image record medium 30.

The distance information and living body information acquisition part 10 includes an infrared radiation sensor 34 and an infrared radiation sensor circuit 36. The infrared radiation sensor 34 includes a light-emitting element 38 and a light-sensitive element 40 for infrared radiation. To the light-emitting element 38, a driving signal is added from the control circuit 24 via a driving circuit 42, which gives off light in accordance with the operation of the photographing start key 28, and thus the infrared radiation is applied to the photographing target. Further, the infrared radiation acquired at the light-sensitive element 40 from the photographing target is added to a temperature detection circuit 44 and a distance detection circuit 46. At the temperature detection circuit 44, a temperature is detected from the received infrared radiation as a living body information the target possesses; while at the distance detection circuit 46, reflected infrared radiation of the above described infrared radiation that have been applied from the light-emitting element 38 is detected as a distance information. Each output from the temperature detection circuit 44 and the distance detection circuit 46 is added to the control circuit 26 after having been converted into digital signals via an A/D (Analog-to-Digital converter) 48, 50 respectively. At the control circuit 26, by using a spectral data of the infrared radiation or the like detected at the temperature detection circuit 44, a judgment is made whether the target is a person or not. Furthermore, by calculating the time from the beginning of emission of the infrared radiation until the reception thereof, the distance between the mobile terminal device 2 and the light-sensitive element 40 is measured. This distance information is used to specify the location of origin of the living body information acquired from the target and also used to specify the location of the response information issued from the target, and used as judging materials for the living body information and the response information.

The photographing approval/disapproval inquiry part 12 includes a voice generation circuit 52 and a speaker 54, and the voice generation circuit 52 includes a ROM 56, a RAM 58, and a D/A (Digital-to-Analog converter) 60. The ROM 56 stores a voice message data that is an inquiry information, and the voice message data is read into the RAM 58. This voice message data is converted into analog signals via the D/A 60, and then outputted from the speaker 54 as the photographing inquiry information in electronic sounds, for example, "Is it OK to take a photo?" The output timing of this voice message is simultaneous with when the photographing start key 28 is pressed down or a certain seconds later after the key is pressed down.

Further, the response information acquisition part 14 includes a voice recognition circuit 62 and a microphone 64, and the voice recognition circuit 62 includes a ROM 66, a RAM 68, and an A/D 70. The microphone 64 uses a microphone with directivity in order to acquire voice for representing approval/disapproval of photographing that is a response information from the target. The voice picked up at the microphone 64 is converted into digital signals at the A/D 70, and a judgment is made about whether permission is acquired from the target based on the message information such as tones of the voice and languages and the like.

In such a mobile terminal device 2, as shown in FIG. 5, two case parts 72 and 74 are connected to be openable/closable via a hinge part 76, and the operation input part 18 is disposed on the case part 72, and this operation input part 18 includes the photographing start key 28. For instance, pressing the photographing start key 28 halfway down starts photographing mode; and further pressing the photographing start key 28 all the way down can release the shutter. Furthermore, the case part 74 includes the display part 16 and on its rear side, the camera part 20, the speaker 54, the microphone 64, and the infrared radiation sensor 34 and others are disposed.

Figure 6:
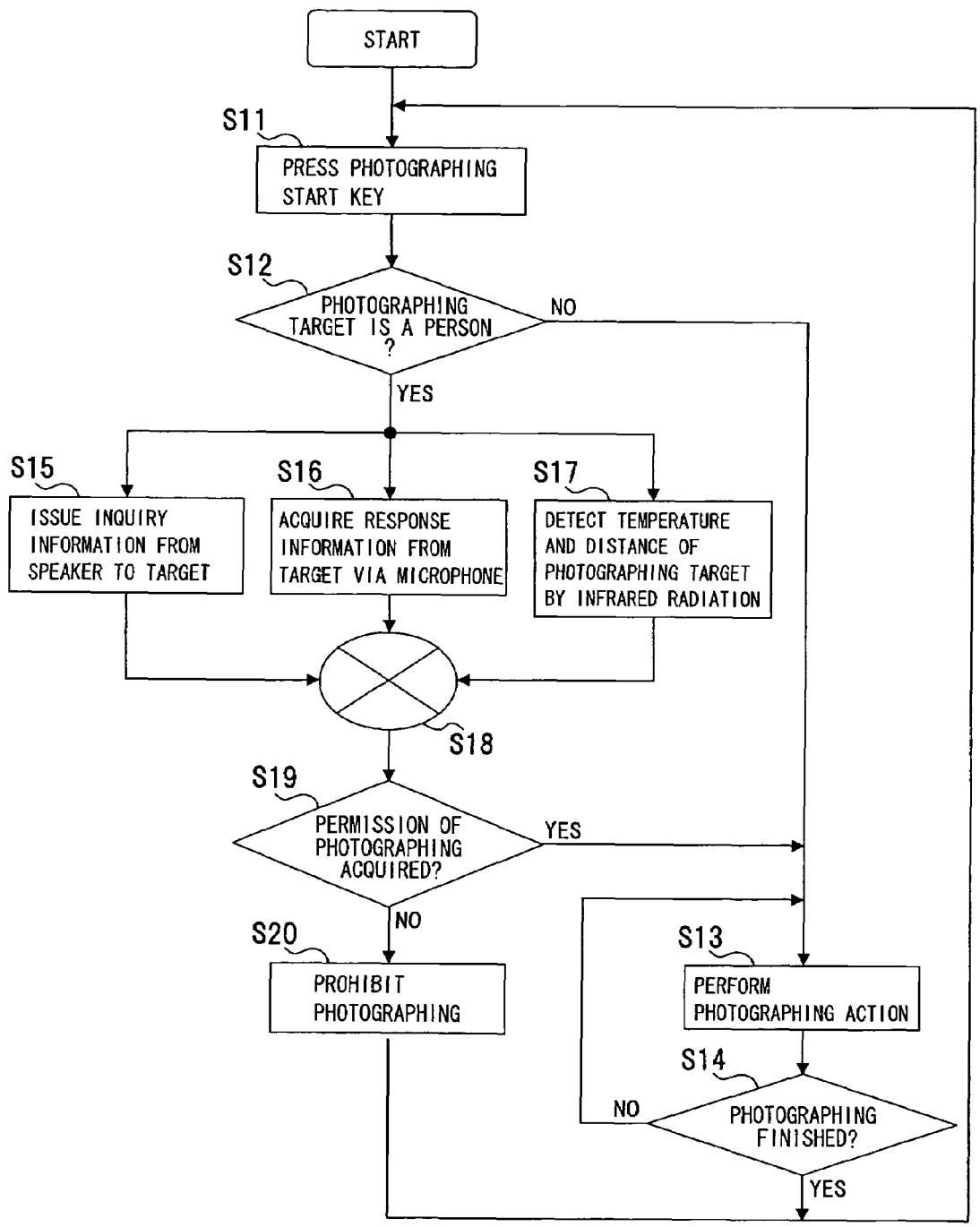
FIG. 6 is a flowchart showing photographing control operation of the mobile terminal device.

The photographing control operation of this mobile terminal device 2 will be described with reference to FIG. 6. FIG. 6 is a flowchart showing photographing control operation, which is one example of a photographing control method and a photographing control program.

When the photographing start key 28 is pressed down (step S11), a judgment is made about whether a photographing target is a person or not (step S12). A shot image is used for this judgment, and a judgment is made about whether the target is a person or not by the existence of a human face in the shot image to be acquired from the target by pressing down the photographing start key 28.

If the target is not a person, then photographing operation is performed immediately without the processing of acquiring the approval/disapproval information of photographing (step S13). In this photographing operation, the shot image in the middle of acquiring is stored into the shot image storage part 8. The procedure monitors whether the photographing is finished or not (step S14), and continues the photographing operation until it finishes, then returns to step S11 when it is finished.

If the target is a person, then an inquiry information is issued from the speaker 54 to the photographing target as the processing of acquiring the approval/disapproval information of photographing (step S15); a response information that corresponds to this inquiry information is picked up at the microphone 64 from the target (step S16); further, a temperature of the target and a distance of the target are detected by the infrared radiation sensor 34 as a confirmation information of the target (step S17). These information are captured into the photographing control part 6 (step S18), and a judgment is made about whether there is a photographing approval from the target or not (step S19). If the photographing approval exists, then the procedure shifts to step S13 to perform photographing operation. If the photographing is not approved, then the processing of prohibiting the photographing is executed (step S20), and then returns to step S11. In the case where photographing is not approved, storage of shot images is banned by discarding the shot image in the middle of acquiring or the like.

That is, the contents of the voice acquired via the microphone 64 with directivity as a response information from the person of the photographing target (subject) to the voice issued from the speaker 54 is analyzed at the control circuit 26 through the voice recognition circuit 62, and a judgment is made about whether photographing permission is acquired. In these processing, measurement results of the distance to the target and the temperature serve as materials to judge whether the voice belongs to the person of the photographing target. This enables to obtain a judgment with higher accuracy and suppresses a situation where photographing is prohibited when the target is not a person.

Figure 7:
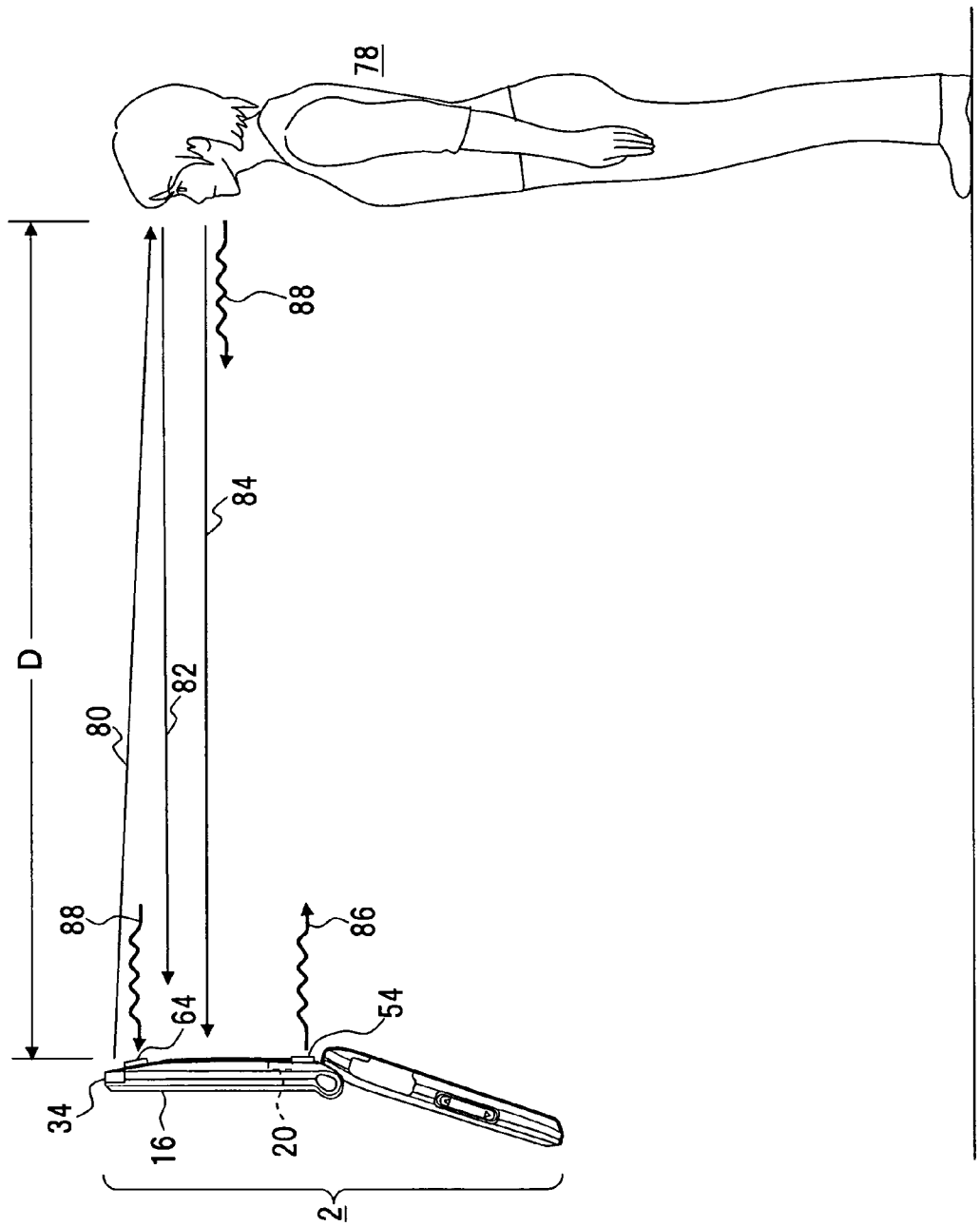
FIG. 7 is a diagram showing photographing operation of the mobile terminal device.

In this photographing processing, for example, as shown in FIG. 7, by pressing down the photographing start key 28, a shot image is acquired from a photographing target 78 and displayed on the display part 16 of the mobile terminal device 2. From a figure of this shot image, a judgment is made whether the photographing target 78 is a person or not.

At that time, an infrared radiation 80 is emitted from the light-emitting element 38 of the infrared radiation sensor 34, and its reflected infrared radiation 82 is received at the light-sensitive element 40. A distance D is measured by time difference between the infrared radiation 80 and the reflected infrared radiation 82. Further, in the case where the photographing target 78 is a person, the light-sensitive element 40 captures an infrared radiation 84 emitted from the person as a temperature information (living body information) and uses for a judgment whether the photographing target 78 is a person or not. In this case, the distance D is referenced for specifying the location where the living information is acquired, in order to increase the accuracy of judgment of a person.

Then, an inquiry information 86 for inquiring approval/disapproval of the photographing is issued from the speaker 54 and a response voice (response information) 88 outputted from the photographing target 78 is detected at the microphone 64. The distance D is also referenced when this response voice is acquired, which is used for making a judgment whether the voice is outputted from the specific person. With this, accuracy of specifying whether or not the target is a person as well as accuracy of specifying whether or not the target is the person issuing an approval can be improved.

Figure 8:
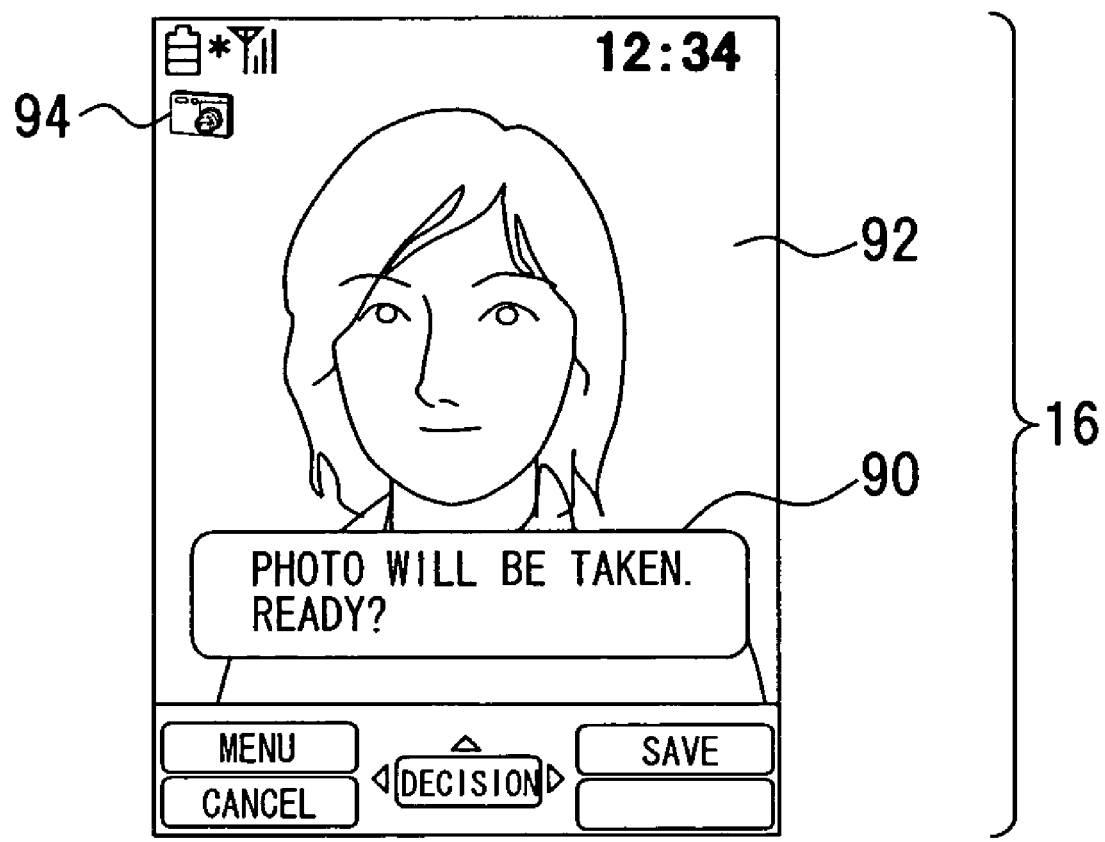
FIG. 8 is a diagram showing a display content at the time of photographing.

Further, in such photographing operations, when the inquiry information for approval/disapproval of the photographing is issued from the speaker 54, for example, as shown in FIG. 8, the display part 16 may display a display characters 90 for representing a voice message disposed over the shot image 92 simultaneously with the issuing of the inquiry information or in synchronization with its issuing. Displaying the display characters 90 corresponding to the inquiry information in this way enables the photographer to visually identify the issuing of the inquiry information and also serves an impetus for the photographer to refrain from taking photos without consent. A reference numeral 94 shows a photographing mode display indicating that it is in the photographing mode.

Third Embodiment

Figure 9:
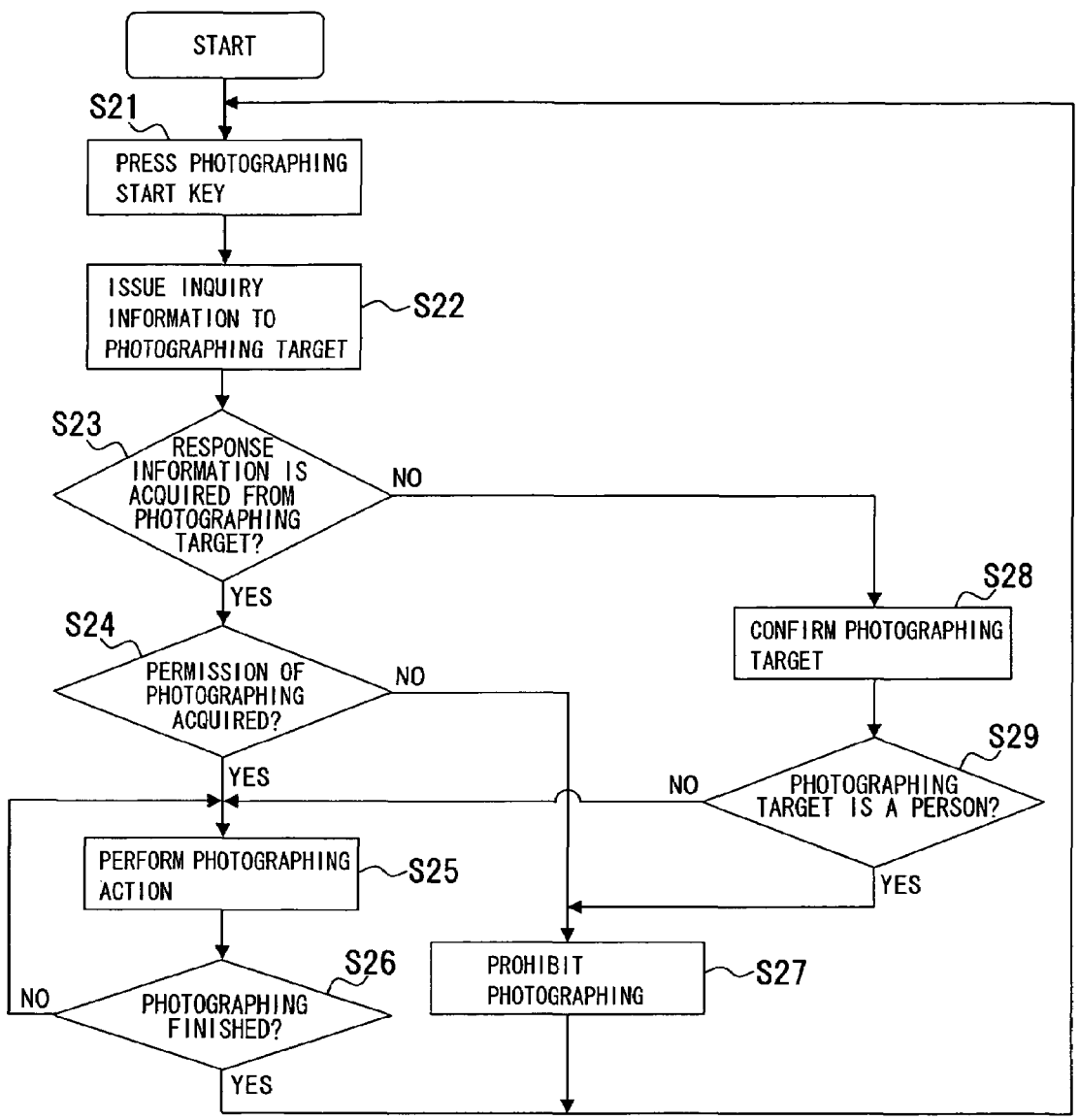
FIG. 9 is a flowchart showing photographing control operation of the mobile terminal device according to a third embodiment.

A third embodiment of the present invention will be described with reference to FIG. 9. FIG. 9 is a flowchart showing photographing control operation, which is one example of a photographing control method and a photographing control program according to a third embodiment.

In this embodiment, when the photographing start key 28 is pressed down, the photographing mode is set in (step S21) and simultaneously with this shift to the photographing mode, an inquiry information is issued to the photographing target (step S22). Here, the processing of step S12 (FIG. 6) in the previous embodiment is omitted. A response information from the target to the inquiry information for the target is monitored (step S23); and when the response information is acquired from the target, a judgment is made about whether the photographing is approved or not with the response information (step S24); and when the photographing is approved, the procedure shifts to the photographing operation (step S25); and after making judgment whether the photographing is finished or not (step S26); the procedure returns to step S21. Otherwise, when the photographing is denied in step S24, the processing of prohibition of photographing is performed (step S27); and the procedure returns to step S21.

In step S23, when the response information is not acquired from the target, then confirmation processing of the target is performed (step S28); and for this processing, the above-described step S17 (FIG. 6) and others are performed; then a judgment is made about whether the target is a person or not (step S29); and if the target is a person, the procedure shifts to step S27 to perform the processing of prohibition of photographing and returns to step S21. If the target is not a person, the procedure returns to step S21 after the photographing operation (step S25) and its completion (step S26).

In this way, even though the processing of acquiring approval/disapproval information for the photographing is performed immediately after the procedure shifts to the photographing mode, the target can be protected from spy shots and photographing without consent similarly to the previous embodiment, and the photographing can be conducted legally. In addition, in the case where the response information is not acquired from the target, then whether the target is a person or not is checked and if the target is a person, then the photographing is prohibited on the basis that the response information is not acquired; and if the target is not a person, then the photographing operation is brought in, so that the reliability of the processing is enhanced by responding to the target.

Fourth Embodiment

Figure 10:
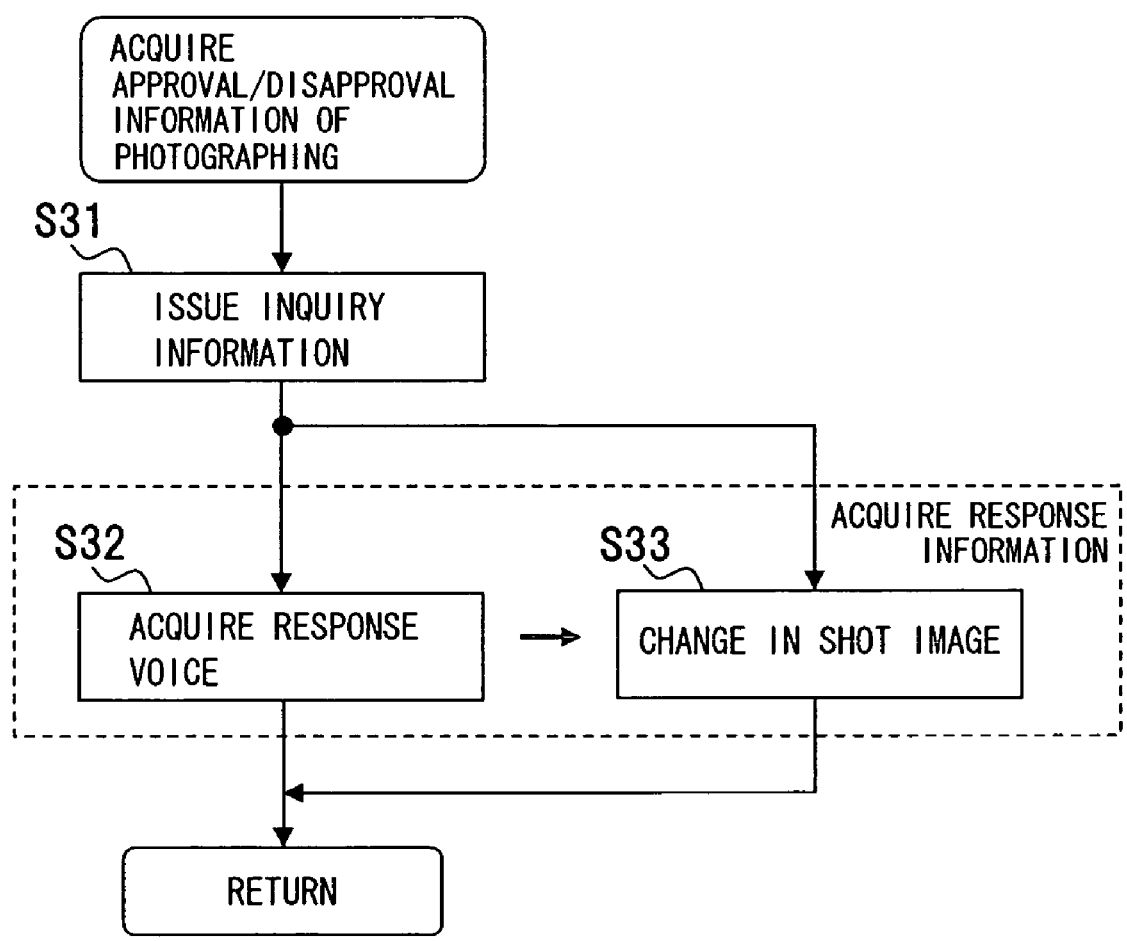
FIG. 10 is a flowchart showing acquisition operation of an approval/disapproval information for photographing according to a fourth embodiment.
Figure 11A:
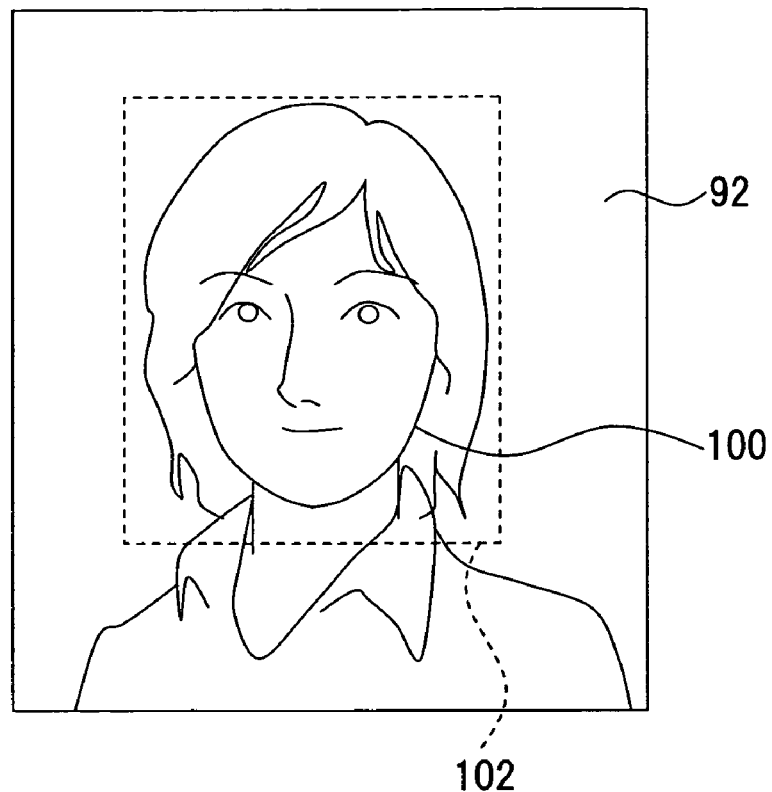
FIGS. 11A and 11B are diagrams showing acquisition of change in a shot image corresponding to a response information.
Figure 11B:
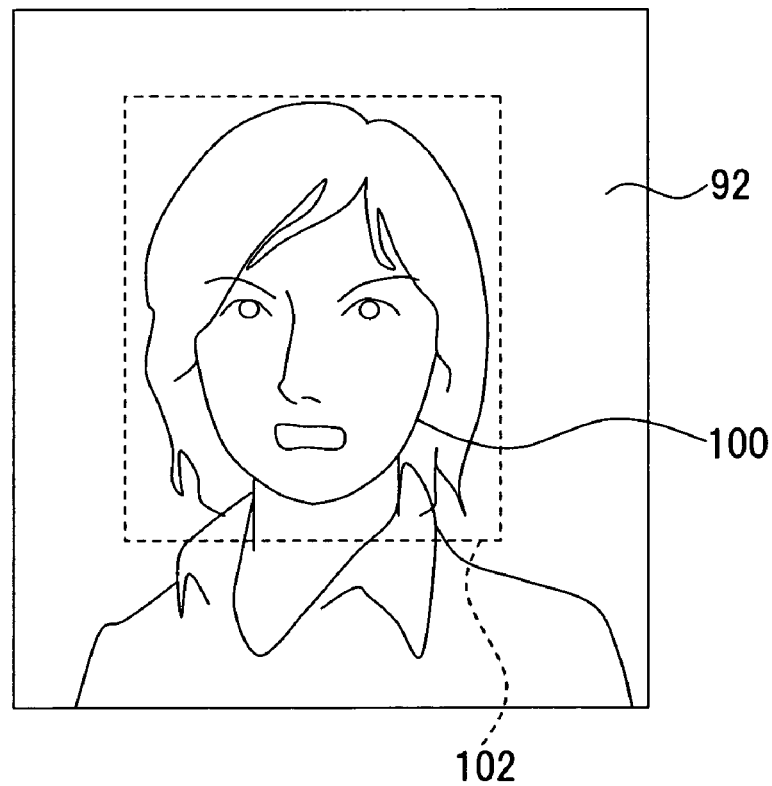

A fourth embodiment of the present invention will be described with reference to FIGS. 10, 11A, and 11B. FIG. 10 is a flowchart showing the acquisition operation of a photographing approval/disapproval information of the mobile terminal device according to a fourth embodiment. FIGS. 11A and 11B are diagrams showing a shot image for acquiring a response information.

If an inquiry information is issued (step S31) for acquiring a photographing approval/disapproval information (step S5, FIG. 2); then a response voice (response information) 88 is acquired through the microphone 64 as a response information (step S32); and a change in the shot image 92 that accompanies the response voice is acquired from the camera part 20 (step S33). When an inquiry information is issued to the target while the shot image 92 is acquired, in order to respond to the inquiry, a change will appear in the shot image 92 representing the target reacting to the inquiry information. Thus, an action of the target is captured simultaneously with the response voice 88 vocalized by the target as a change in the shot image 92.

In this case, as shown in FIGS. 11A, 11B, a change detection area 102 is set for an image 100 representing the target 78 in the shot image 92 (FIG. 7); and in this change detection area 102, for example, a change in the lips or in the expression is detected. FIG. 11A shows the image 100 before the change and the FIG. 11B shows the image 100 after the change. By detecting such a change in the image appearing in the change detection area 102, with the condition that the change corresponds to the inquiry information and appears simultaneously with the response information, the target 78 who has issued the response information can be specified. That is, whether the originator of the photographing approval is identical to the target 78 (FIG. 7) or not can be verified.

In this embodiment, the change detection area 102 is set to detect a change in the shot image 92; however, this is just one example and detection may be performed by tracking down movements of the eyes or the lips or the like.

Fifth Embodiment

Figure 12:
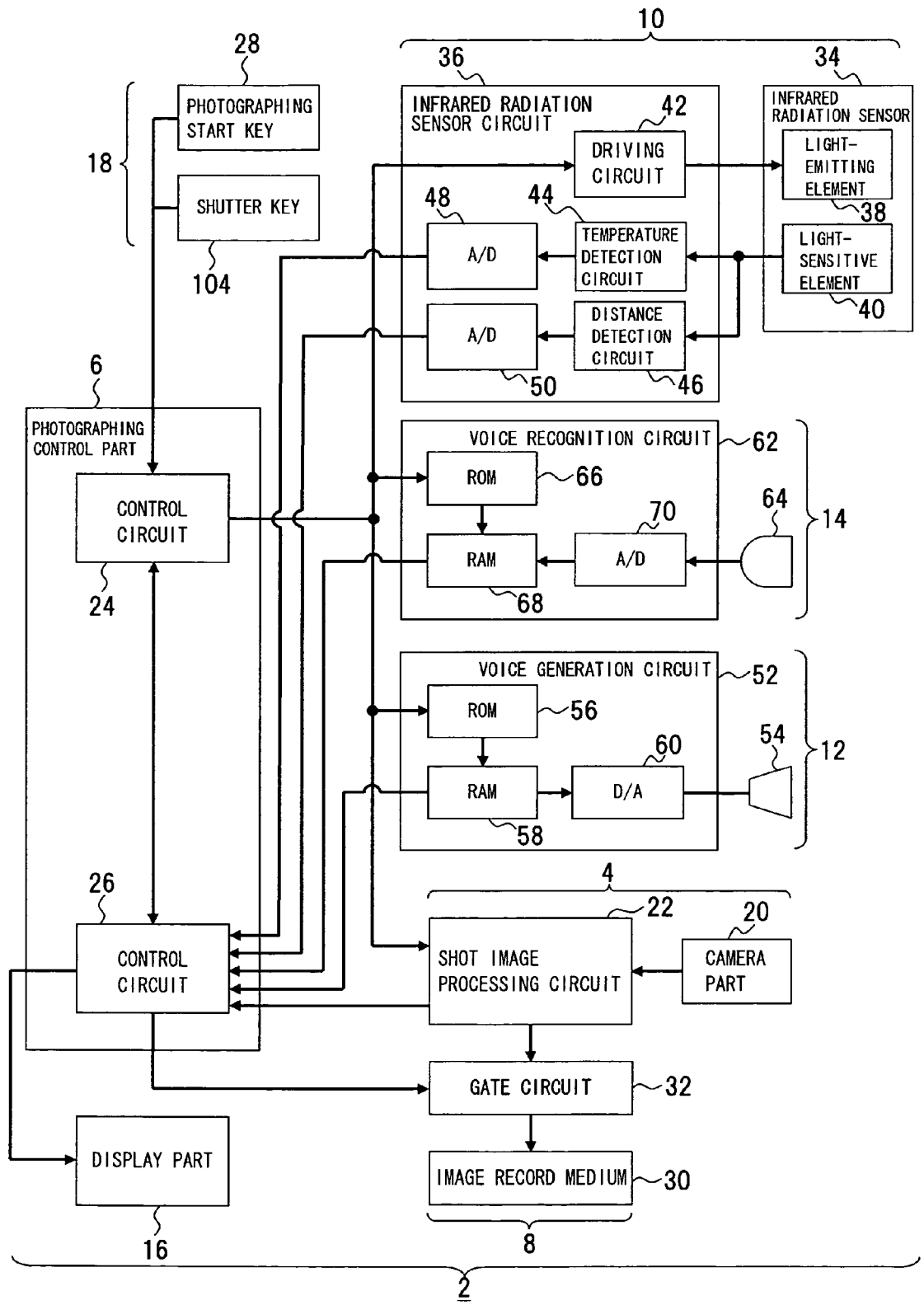
FIG. 12 is a block diagram showing a mobile terminal device according to a fifth embodiment.

A fifth embodiment of the present invention will be described with reference to FIG. 12. FIG. 12 is a block diagram showing a mobile terminal device according to a fifth embodiment. In FIG. 12, the same symbols are assigned to parts identical to those of the mobile terminal device in FIGS. 1 and 4.

In this embodiment, a shutter key 104 is disposed in the operation input part 18 separately from the photographing start key 28; the photographing operation is started with the photographing start key 28; and after the operation is started, the shot image 92 is captured by the operation of the shutter key 104 into the image record medium 30 through the gate circuit 32.

In this case, by pressing down the photographing start key 28, the processing shown in the flowcharts in FIGS. 2 and 3 is performed; and if the target is a person and if a photographing approval is acquired from the person, i.e., the subject, the pressed down information of the shutter key 104 is captured; the gate circuit 32 is controlled to be a conductive state by both the pressed down information and the photographing approval information; and the shot image is captured into the image record medium 30.

Configuring as such can draw the attention of the target to the photographing with the inquiry information, can serve as an impetus for the photographer to refrain from taking photos without consent such as spy shots, and makes it possible to capture a rightful shot image into the image record medium 30.

Sixth Embodiment

Figure 13:
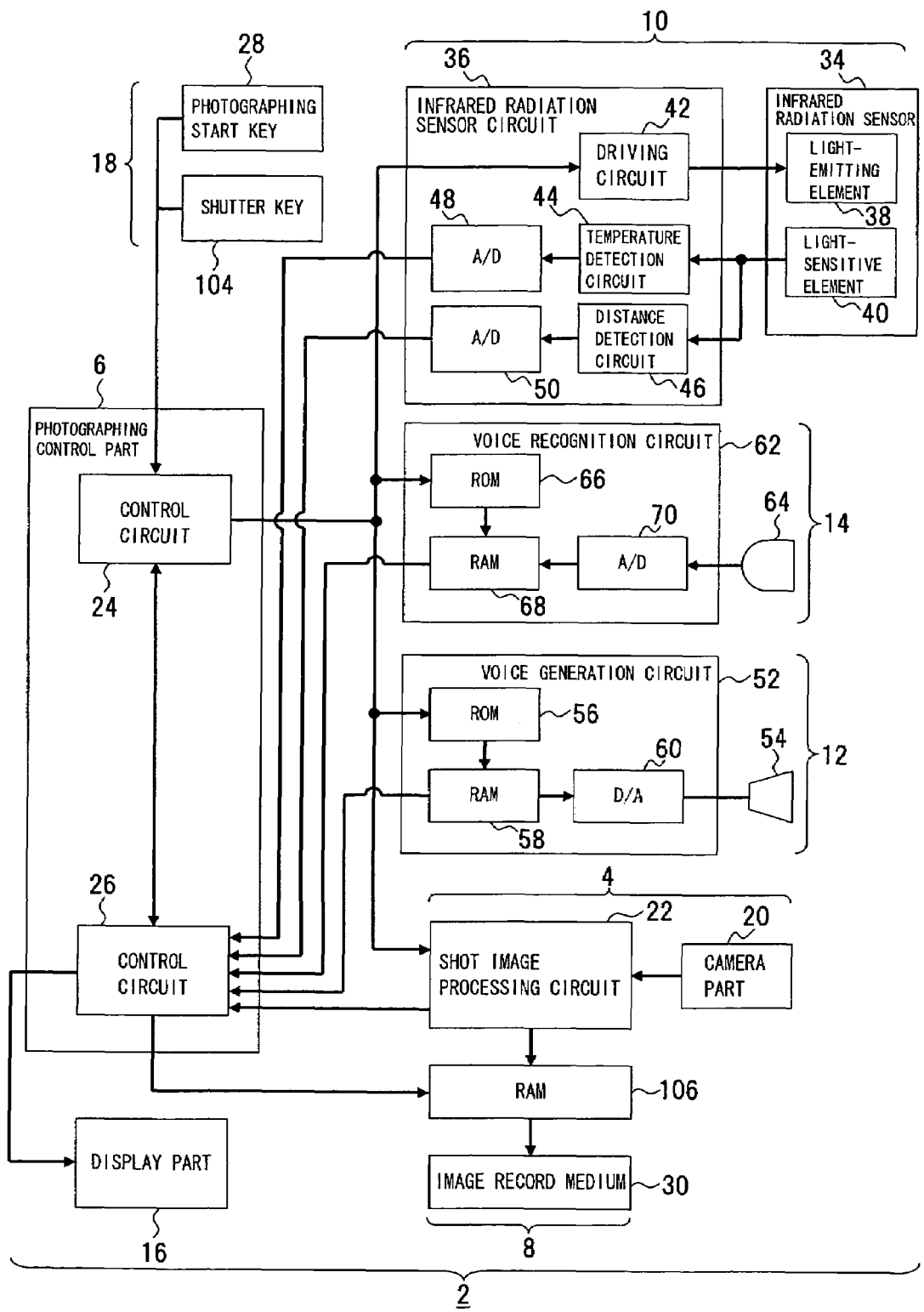
FIG. 13 is a block diagram showing a mobile terminal device according to a sixth embodiment.

A sixth embodiment of the present invention will be described with reference to FIG. 13. FIG. 13 is a block diagram showing a mobile terminal device according to a sixth embodiment. In FIG. 13, the same symbols are assigned to parts identical to those of the mobile terminal device in FIGS. 1 and 12.

In this embodiment, a RAM 106 is provided as an image holding part in place of the gate circuit 32 (FIGS. 1, 12); and this RAM 106 holds a shot image and that shot image is stored into the image record medium 30 through the control output of the control circuit 26.

According to this configuration, the internal memory of the shot image processing circuit 22 can be configured of the RAM 106 and the gate circuit 32 can be omitted. Further, the shot image 92 (FIG. 11) is held in the RAM 106 in the middle of the photographing and this shot image 92 is displayed on the display part 16. Unless a photographing approval is acquired, this shot image 92 is not captured into the image record medium 30 and the shot image 92 without consent will not be recorded into the image record medium 30.

Figure 14:
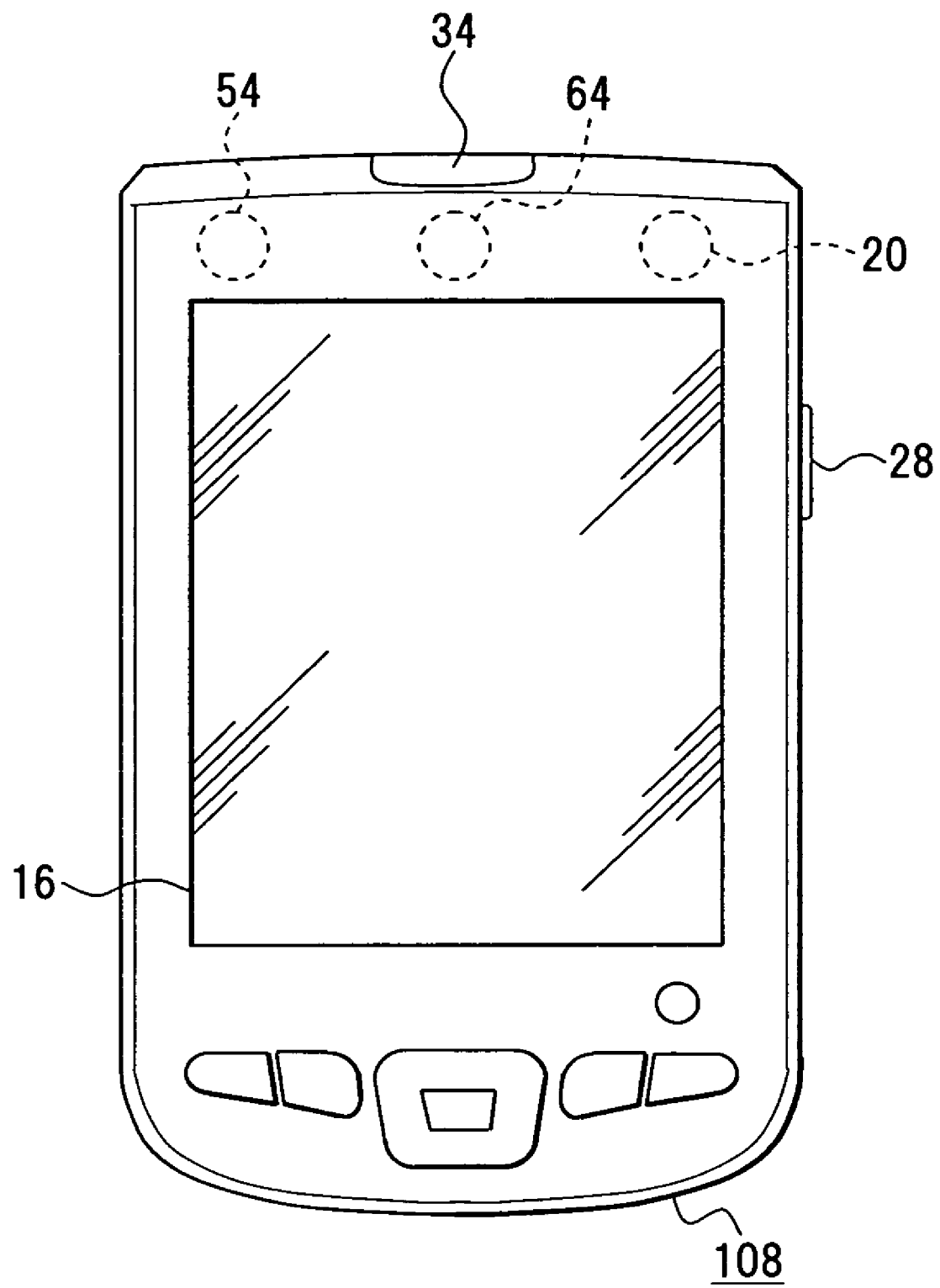
FIG. 14 is a diagram showing a PDA according to other embodiments.

Other Embodiments (1) In the above-described embodiments, the mobile terminal device 2 was exemplified as an electronic device with a photographing function. However, the present invention can also be applied to a PDA (Personal Digital Assistant) 108 as shown in FIG. 14. In FIG. 14, the same symbols are assigned to parts identical to those of the mobile terminal device 2 in FIG. 5 and the explanations are omitted. Such a PDA 108 can also notify the target about the photographing by the inquiry information and can serve as an impetus for the photographer to refrain from taking photos without consent such as spy shots, similarly to the mobile terminal device 2.

Figure 15:
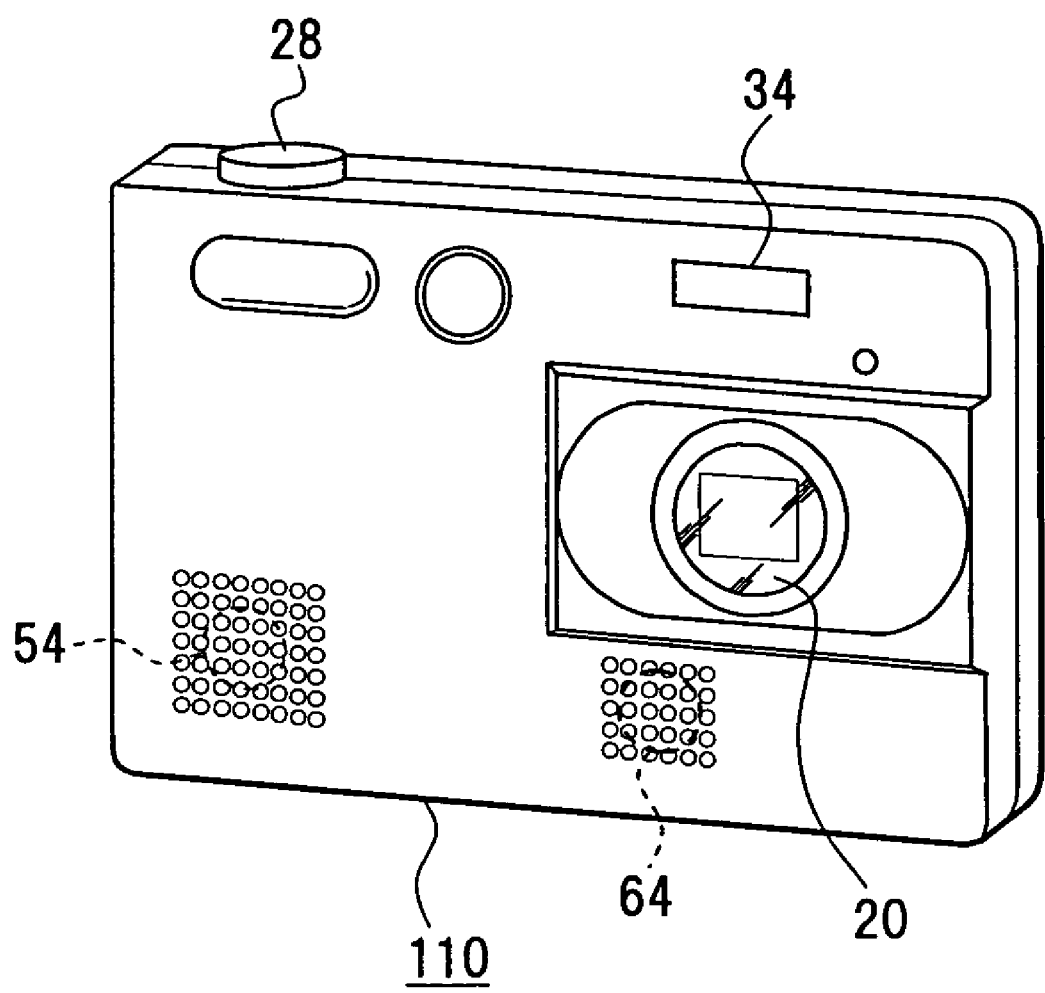
FIG. 15 is a diagram of a digital camera according to other embodiments viewed from its front side.
Figure 16:
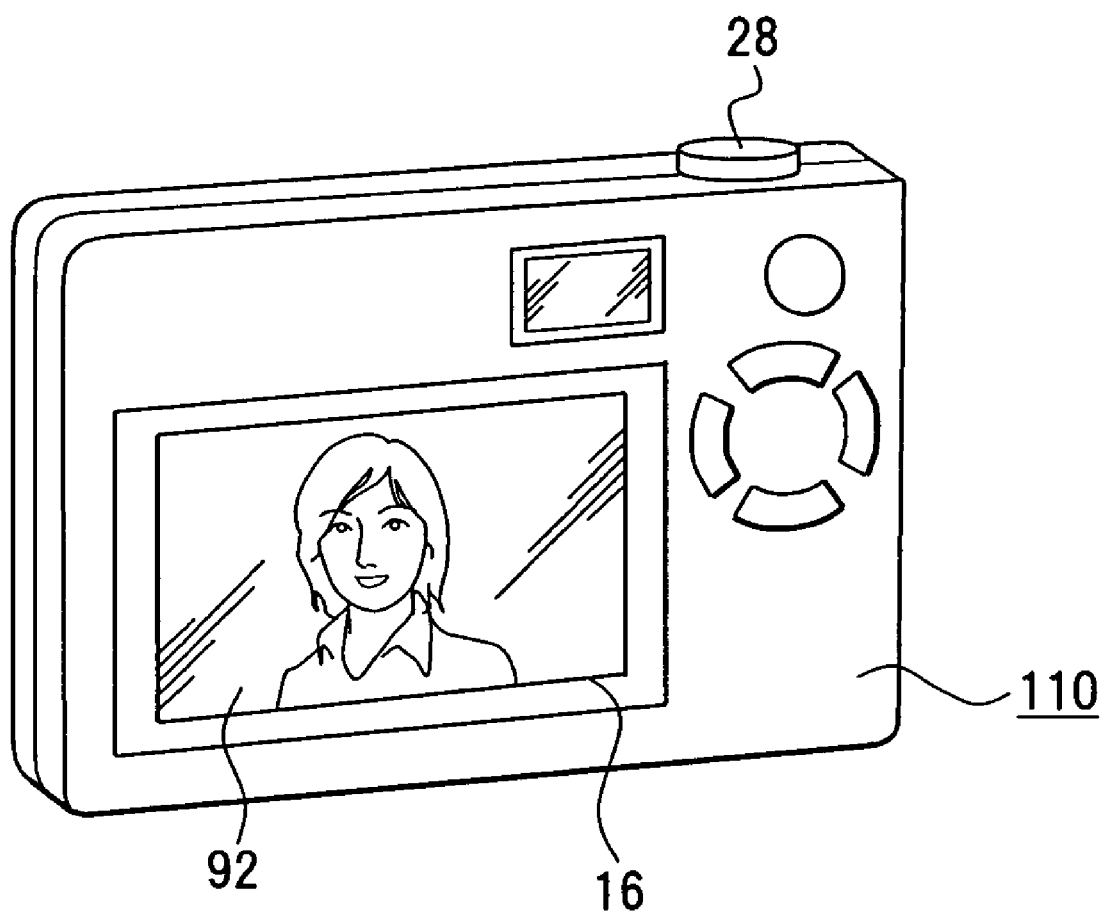
FIG. 16 is a diagram of a digital camera according to other embodiments viewed from its rear side.

(2) Furthermore, the present invention can also be applied to a digital camera 110 as shown in FIGS. 15 and 16. FIG. 15 is a diagram of the digital camera 110 viewed from its front side; and FIG. 16 is a diagram of the digital camera viewed from its rear side. In FIGS. 15, 16, the same symbols are assigned to parts identical to those of the mobile terminal device 2 in FIG. 5 and the explanations are omitted. Such a digital camera 110 can also notify the target about the photographing by the inquiry information and can serve as an impetus for the photographer to refrain from taking photos without consent such as spy shots, similarly to the mobile terminal device 2.

(3) The image record medium 30 in the above-described embodiments can also be comprised of an internal memory of electronic devices and can be a removable expansion memory or external memory device.

(4) In the above-described embodiments, the explanation has been made for the case where the photographing control section 6 performs the processing of judgment of a person with the use of the response information and the living body information and judgment of approval/disapproval of photographing or the like; however, a configuration may also be used in which the response information acquisition part 14 and the voice recognition circuit 62 side judge approval/disapproval of photographing issued by the target and the photographing control section 6 that has received the judgment result controls the gate circuit 32 and the RAM 106.

A most preferred embodiment and the like of the present invention have been described above. However, the present invention is not limited to the above description; it goes without saying that various modifications and alterations may be made by a person skilled in the art on the basis of the gist of the invention that is described in the claims and disclosed in the detailed description of the invention, and that such modifications and alterations are included in the scope of the present invention.

The present invention relates to an electronic device such as mobile terminal devices with a photographing function, and since it judges whether a photographing target is a person or not; issues an inquiry information to the photographing target; and decides approval or disapproval of photographing and capturing of a shot image based on a response information, it is useful such that it contributes to protect the target from spy shots and photographing without consent.

What is claimed is:

1. An electronic device with a photographing function, comprising:
    a target judging part judging whether a photographing target is a person or not; and
    a photographing inquiry part issuing an inquiry information for approval/disapproval of photographing based on the judgment result of the target judging part if the photographing target is a person and making an inquiry for the target about whether the photographing is approved or not with the inquiry information.

2. The electronic device of claim 1, further comprising an image acquisition part acquiring a shot image from the photographing target, wherein the target judging part judges whether the target is a person or not from the shot image acquired at the image acquisition part.

3. A photographing control method of an electronic device with a photographing function, comprising the processing of:
    judging whether a photographing target is a person or not; and
    issuing an inquiry information for approval/disapproval of photographing based on the judgment result if the photographing target is a person and making an inquiry for the target about whether the photographing is approved or not with the inquiry information.

4. The photographing control method of an electronic device of claim 3, further comprising the processing of:
    acquiring a shot, image from the photographing target; and
    judging whether the photographing target is a person or not from the acquired shot image.

5. A photographing control program of an electronic device with a photographing function, the program to be executed by a computer, comprising the steps of:
    judging whether a photographing target is a person or not; and
    issuing an inquiry information for approval/disapproval of photographing based on the judgment result if the photographing target is a person and making an inquiry for the target about whether the photographing is approved or not with the inquiry information.

6. The photographing control program of an electronic device of claim 5, further comprising the steps of:
    acquiring a shot image from the photographing target; and
    judging whether the photographing target is a person or not from the acquired shot image.

* * * * *